United States Patent [19]

Siegmund, deceased et al.

[11] Patent Number: 5,114,475

[45] Date of Patent: May 19, 1992

[54] METHOD FOR THE PREPARATION OF A FINE-GRAINED MIXTURE HAVING HYDROPHOBIC PROPERTIES

[75] Inventors: Werner Siegmund, deceased, late of Heiligkreuzsteinach, by Gisela Siegmund, executrix; Wilhelm Kämereit, Düsseldorf; Oskar M. Schmitt, Stolberg; Volker Weidmann, Den Haag; Otto J. Friedrich, Düsseldorf, all of Fed. Rep. of Germany

[73] Assignee: Mannesmann Aktiengesellschaft, Düsseldorf, Fed. Rep. of Germany

[21] Appl. No.: 597,440

[22] Filed: Oct. 15, 1990

[30] Foreign Application Priority Data

Oct. 13, 1989 [DE] Fed. Rep. of Germany ....... 3934657
May 25, 1990 [DE] Fed. Rep. of Germany ....... 4017291
Jun. 21, 1990 [DE] Fed. Rep. of Germany ....... 4020009

[51] Int. Cl.$^5$ .......................... C09K 9/12; C09K 3/14
[52] U.S. Cl. .................. 106/13; 106/DIG. 7; 404/19; 404/20; 427/138; 252/70
[58] Field of Search .............. 106/901, 772, 773, 705, 106/706, 811, 672, 675, 680, DIG. 1, 7, 13; 404/19, 20; 427/136, 138, 221; 521/53, 55; 252/70

[56] References Cited

U.S. PATENT DOCUMENTS

| | | | |
|---|---|---|---|
| 3,690,227 | 9/1972 | Welty | 404/20 |
| 4,012,537 | 3/1977 | Dubois | 404/19 |
| 4,094,686 | 6/1978 | Dubois | 404/19 |
| 4,296,207 | 10/1981 | Siegmund | 106/DIG. 7 |
| 4,662,972 | 5/1987 | Thompson | 404/19 |

*Primary Examiner*—William R. Dixon, Jr.
*Assistant Examiner*—Paul Marcantoni
*Attorney, Agent, or Firm*—Cohen, Pontani, Lieberman & Pavane

[57] ABSTRACT

Preparation of a fine-grained mixture having hydrophobic properties and a grain size substantially less than 0.2 mm and preferable less than 0.1 mm for asphalt-treatment and de-icing, having a hydrophobic component with a hydrophilic component of at least 50% by weight of the mixture and having 55–99.5% by weight of a residual salt which results from the production of glycerol and 45–0.05% by weight of an additive consisting of salts, oxides, hydoxides, and combinations thereof, in the moist condition and at least partially ground with the residual salt, and containing alkali-earth metal or other non-alkali metals as cations.

15 Claims, No Drawings

METHOD FOR THE PREPARATION OF A FINE-GRAINED MIXTURE HAVING HYDROPHOBIC PROPERTIES

FIELD OF THE INVENTION

The present invention relates to a method for preparing a fine-grained mixture having hydrophobic properties and a grain size substantially less than 0.2 mm, and preferably less than 0.1 mm, comprising the mixing of a hydrophilic component at least one salt, with a hydrophobic component, in the absence of a liquid phase.

BACKGROUND OF THE INVENTION

Fine-grained mixtures can be used as additives or fillers for the construction or treatment of pavings or traffic surfaces, like asphalt-bound roadways. When such mixtures possess a salt content, their addition to the surface of a paving causes a lowering of the freezing point of water (rain, snow, sleet or the like), and thus in winter, contributes to an increase in traffic safety by preventing icing, especially at ambient temperatures fluctuating around 0° C., and makes snow removal easier since the adhesion of snow to the pavement surface is definitely reduced.

It is essential that the additive has hydrophobic properties in order, on the one hand, to insure its workability (free-flowing property, no agglomeration) and, on the other hand, to maintain its freezing-point lowering action over very long periods of time despite the action of surface water.

Numerous methods are known for the preparation of salt-containing additives of similar action for roadway paving. In these methods, the salt, in dissolved form, is deposited in the voids of a porous carrier material or is deposited on a fibrous material and an additive, which has been mixed with a hydrophobizing agent, is obtained by drying and subsequent grinding. By way of example, reference can be made to Federal Republic of Germany Patent 25 12 591, European Patent 00 22 055, Federal Republic of Germany Patent 29 45 823, European Patent 00 48 417 and Federal Republic of Germany Patent 31 47 773. A disadvantage of these methods is the energy consumption necessary for drying.

This disadvantage can be remedied by means of a method disclosed in European Patent 0,153,269 which belongs to the same generic class as the present invention but differs in some important respects. This prior art method avoids drying of the additive, since the hydrophilic component (salt and possibly powdered lava and/or powdered quarts) and the hydrophobic component (powdered foamed polyurethane resin and/or carbon black and/or calcined perlite) of this additive, are combined in dry form and ground together without using a liquid intermediate phase. The fine-grained mixture produced in this way, having a grain size of less than 0.2 mm, and preferably less than 0.1 mm, is therefore free from recrystallization products or gels produced from the combination of the components, in contrast to the result obtained when working with a liquid phase.

In the preparation of the fine-grained mixture of the above prior art type, the content of the required salt (in particular sodium chloride) represents a substantial cost factor. An attempt is therefore made to use waste salts (e.g., from potassium production) costing as little as possible for this purpose, especially since there are no special requirements for the purity of the salt per se for this application. It need only be free of environmentally harmful accompanying substances.

Since, however, the cost is still considerable for waste salts from potassium production, it is desirable to seek additional cost-lowering alternatives. One such possible alternative is the use of residual salts such as those resulting from the production of glycerol, by distillation of spent-spent-lye crude glycerol from soap production. These salts contain essentially sodium chloride and are contaminated with accompanying substances.

The use of such residual salts from glycerol production in the method of this type, however, involves difficulties. For one thing, it is a concern that the residual soap content present with the salt will dissolve in the presence of moisture, leading to unwanted and unacceptable formation of a slick on the wet roadway paving. For another, test have shown that in this type of method this residual salt does not lead to a fine-grained mixture with hydrophobic properties. The use of other highly effective but extremely expensive hydrophobizing agents, even when they are added in large quantities, results in no hydrophobization, or at least inadequate hydrophobization, of the fine-grained mixture. To date, therefore, these residual slats have not been suitable for the preparation of icing-inhibiting paving additives either from the standpoint of the desires cost-reducing effect (cost increase due to expensive hydrophobizing agents) or from the technical standpoint.

It is therefore the object of the invention to make possible the use of residual salts, in particular of the aforementioned type from glycerol production, for the preparation of a filler for pavements and traffic surfaces, that is, in particular, to provide a method in which a satisfactory hydrophobization of the fine-grained mixture can be achieved at low cost.

DETAILED DESCRIPTION OF THE INVENTION

In accordance with the invention, this and other objects and features of the invention are achieved by a method for preparing a fine-grained mixture having hydrophobic properties and a grain size substantially less than 0.2 mm, and preferable less than 0.1 mm, comprising mixing or grinding hydrophobic and hydrophobic components, wherein the hydrophilic component is at least 50% by weight of the mixture, and is comprised of 55-99.5% by weight of a residual salt and 45-0.5% by weight of an additive, wherein said residual salt results from the production of glycerol and consists essentially of sodium chloride and said additive is selected from the group consisting of salts, oxides, and hydroxides, wherein said additive is in the moist condition and ground with said residual salt, and further wherein said additive contains alkali-earth metals or other non-alkali metals as cations.

Because the residual salt resulting from glycerol production has been applied only to a limited extent to a new use and, if it occurs in a large quantity, must be disposed of as hazardous waste at some cost, it was especially desirable to seek and discover an additional reuse as an element of a fine-grained mixture, as described herein. Wholly unexpected, however, were the difficulties with regard to giving the mixture hydrophobic characteristics, which, prior to the instant invention, was not satisfactorily possible even with the addition of highly effective hydrophobic agents. It was therefore all the more surprising to find that very good hydrophobic qualities are attained after grinding together of the residual salt with 0.5 to 45% (by weight of the hydrophilic component) of an additive, comprising a salt or oxide or hydroxide, whose cations do not consist of alkali metals. Salts and hydroxides with Fe, Zn, Al or Ca as cations are especially suitable. Grinding together expediently takes place in neither the wet nor the fully dry condition, but requires only a slightly moist condition. If the moisture content is too high, possibly a corresponding drying is effected before or during grinding. It is merely necessary to make certain that the product is free-flowing. In comparison with the known wet production methods, however, the energy consumption for this is comparatively low. As a rule, separate drying can be dispensed with.

In order to achieve especially good hydrophobic properties of the fine-grained mixture, additional hydrophobic agents can still be added during grinding or in a subsequent mixing process. Thus, for example, the use of low-cost hydrophobic agents such as powdered foamed polyurethane resin, carbon black or calcined perlite is possible with no further steps.

One very special advantage of the invention consists in the fact that calcium sulfate in the form of flue-gas gypsum from flue-gas desulfurization equipment can be used as the additive, so that, besides the residual salt, a further waste product can be used in the method of the invention and converted into a product of high economic and technical value. The gypsum occurring in flue-gas desulfurization equipment is generally not markedly wet but has only a certain residual moisture content. In this normally moist condition, it is outstandingly suitable for the method in accordance with the invention since separate drying of the product before or after grinding together with the residual salt is rendered superfluous.

In many cases it is advisable for further substances to be added as grinding aids during grinding together in order to prevent agglomeration and caking. Rock flour or rock sand (e.g., in the form of lava, lime or quartz) or also power-plant fly ash are especially suitable.

The minimum quantity that must be used as the additive depends on the nature of the additive and can easily be determined by means of simple tests. A content of at least 0.5 weight % is necessary even with highly effective additives, while a content of over 45 weight % does not bring about an increase in the hydrophobic qualities in any case. The attainable hydrophobic qualities, even without the addition of special hydrophobic agents at the end of grinding together of residual salt and additive, is often good enough that the product obtained in this way can itself be used as a hydrophobic agent for the creation of hydrophobic qualities of further salt. This additional salt can be residual salt or else any other freezing-point-lowering salt.

It can be either ground dry together with the additional salt or, after separate grinding of the additional salt to a grain size substantially less than 0.09 mm, mixed with said additional salt, and yields an end product with good hydrophobic properties, which has the great advantage of having a very particularly high salt content which can be used for lowering the freezing point, for example in roadway paving.

When additional hydrophobic agents such as, for example, powdered foamed polyurethane resin or calcined perlite are used, the content of these hydrophobic agents (referred to the content of the hydrophobic component) should advantageously be at least 8-10 weight %. The use of carbon black alone as additional hydrophobic agent is less advisable. In contrast, excellent results are achieved when powdered foamed polyurethane resin is added in combination with carbon black (about 1-6 weight % of the hydrophilic component).

The effectiveness of the method of the invention is explained below in more detail on the basis of comparative tests.

In a first test, residual salt from glycerol production (80 weight %), powdered lava (10 weight %) and powdered foamed polyurethane resin (10 weight %) were mixed in a forced-circulation mixer and then ground together to a grain size less than 0.09 mm. The fine-grained mixture prepared in this way was subjected to a hydrophobic-quality test in which a water droplet was carefully placed on the surface of a sample of this fine-grained mixture. The water droplet immediately began to sink into the fine-grained mixture and had completely disappeared from the sample surface after less than one minute.

In a second test, a mixed residual salt which consisted of 85 weight % salt and 15 weight % flue-gas gypsum was used in place of the untreated residual salt. The preparation and composition was otherwise unchanged from the first test. In the hydrophobic-quality test on a sample of this second fine-grained mixture, the water droplet remained standing, virtually unchanged, for over 30 min. After 3 hours, the water droplet was still standing on the fine-grained mixture, even if in the form of a shallow cylinder. No marked sinking into the mixture could be detected; instead, the water droplet first evaporated completely.

In a third test, the residual salt was not mixed with the flue-gas gypsum before the grinding together of the various components of the fine-grained mixture as in test 2; instead, all the components were first combined at the time of grinding. The hydrophobic properties of the fine-grained mixture produced in this way, however, proved not quite as good in this case in comparison with those from the second test.

A still further modification of the second test was performed, in which the content of the residual salt mixed with flue-gas gypsum and a partial quantity of the powdered lava was first ground together into a preliminary mixture of a grain size of less than 0.09 mm, and this preliminary mixture was only then mixed, in a forced-circulation mixer, with the powdered foamed polyurethane resin which had been previously ground with the remaining quantity of the powdered lava to signify less than 0.09 mm. This fine-grained mixture also exhibited a very good hydrophobic action.

In a fifth test, a hydrophobization test was performed on a product in accordance with the invention, which product was obtained from 80 weight % residual salt and 20 weight % of flue-gypsum by grinding together to a grain size of less than 0.09 mm. A water droplet placed on top remained standing for significantly longer than 1 hour without marked moistening of the supporting surface or running out of the drop being observable.

Finally, in a last test, a quantity of 15 weight % of the powder produced in the fifth test was ground dry together with 13 weight % rock flour and 72 % salt which consisted essentially of NaCl. This new product also equaled the sample from the fifth test with regard to its hydrophobic properties.

The fine-grained mixture prepared in accordance with the invention can be processed without problems as a conventional filler used as additive, for example for asphalt-bound pavings of traffic surfaces. At temperatures down to a few degrees Celsius below zero, these pavings have excellent icing-inhibiting action which remains over very long periods of time.

Thus, for example, on specimens in which the additive in accordance with the invention was contained and which were exposed to natural weathering without traffic loading, the icing-inhibiting action was still detected even after 3 years. This long-term action survives all the more under traffic loading because, by means of the steady slight wear of a paving, new ones of the small salt particles uniformly distributed in the asphalt mass are always being exposed, so that effective salt is continually available. The fine-grained mixture in accordance with the invention also brings about no impairment of the surface grip in the case of a wet paving.

It should be understood that the preferred embodiments and examples described above are for illustrative purposes only and are not to be construed as limiting the scope of the present invention. One skilled in the art may depart from these embodiments but still fall within the spirit, intent and scope of the claimed invention.

It is claimed:

1. A method of forming a fine-grained hydrophobic mixture having a grain size less than 0.2 mm, comprising mixing or grinding in an amount of at least 50% by weight of the fine-grained hydrophobic mixture and a hydrophilic component with a hydrophobic component, said hydrophilic component comprising a mixture of 55-99.5% by weight of the hydrophilic component of a residual salt resulting from a separation of spent lye from glycerol produced during soap production and 45-0.5% by weight of the hydrophilic component of an additive selected from the group consisting of salts, oxides and hydroxides, and combinations thereof of alkali-earth metals and non-alkali metals, said additive being at least partially ground and having a moisture content which results in a free-flowing granulate after mixing.

2. The method according to claim 1, wherein said additive has an initial moisture content in excess of that which results in a free-flowing granulate, further comprising the step of drying the additive before or during grinding with said residual salt.

3. The method according to claim 1, further comprising the grinding of the residual salt and additive with a grinding aid selected from the group consisting of rock flour, rock sand and combinations thereof.

4. The method according to claim 1, wherein said additive is selected from the group consisting of salts, oxides and hydroxides of iron, zinc, aluminum and calcium, and combinations thereof.

5. The method according to claim 4, wherein said additive comprises calcium sulfate.

6. The method according to claim 1, comprising the further step of mixing or grinding said fine-grained hydrophobic mixture with an additional amount of said residual salt, said additional amount of said residual salt having been previously subjected to a grinding process.

7. The method according to claim 1, wherein an additional amount of a hydrophobic agent comprising a material selected from the group consisting of carbon black, powdered foamed polyurethane resin, calcined perlite, and combinations thereof is added to said fine-grained hydrophobic mixture during the grinding or mixing step, in an amount sufficient to increase the moisture resistance of the mixture.

8. The method according to claim 7, wherein said additional agent is selected from the group consisting of powdered foamed polyurethane resin, calcined perlite and combinations thereof, in amount equaling at least 10% by weight of the hydrophilic component.

9. The method according to claim 8, wherein said hydrophobic agent is a combination of powdered foamed polyurethane resin and carbon black, and wherein the quantity of carbon black is present in an amount equaling 1-6% by weight of the hydrophilic component.

10. The method according to claim 8, wherein said additive consists of flue-gas gypsum, said residual salt and said flue-gas gypsum are together present in an amount of 80% by weight of said fine-grained hydrophobic mixture, and said hydrophobic component consists of powdered foamed polyurethane resin in an amount of 10% by weight of said fine-grained hydrophobic mixture and additionally comprising solid lava powder in an amount of 10% by weight of said fine-grained hydrophobic mixture.

11. The method according to claim 9, wherein said additive consists of flue-gas gypsum, said residual salt and said flue-gas gypsum are together present in an amount of 80% by weight of said fine-grained hydrophobic mixture, and said hydrophobic component consists of powdered foamed polyurethane resin in an amount of 10% by weight of said fine-grained hydrophobic mixture, and additionally comprising solid lava powder in an amount of 6% by weight of said fine-grained hydrophobic mixture and carbon black in an amount of 4% by weight of said fine-grained hydrophobic mixture.

12. A fine-grained hydrophobic mixture having a grain size less than 0.2 mm, comprising a mixture of 80% by weight of said fine-grained hydrophobic mixture of a mixture of 55-99.5% by weight of a residual salt resulting from a separation of spent lye from glycerol produced during soap production and 45-0.5% by weight of flue-gas gypsum having a moisture content which results in a free-flowing granulate after mixing, a hydrophobic component consisting of powdered foamed polyurethane resin in an amount of 10% by weight of said fine-grained hydrophobic mixture and solid lava and solid lava powder in an amount of 10% by weight of said fine-grained hydrophobic mixture.

13. A fine-grained hydrophobic mixture having a grain size less than 0.2 mm, comprising a mixture of 80% by weight of said fine-grained hydrophobic mixture a mixture of 55-99.5% by weight of a residual salt resulting from a separation of spent lye from glycerol produced during soap production and 45-0.5% by weight of flue-gas gypsum having a moisture content which results in a free-flowing granulate after mixing, a hydrophobic component consisting of powdered foamed polyurethane resin in an amount of 10% by weight of said fine-grained hydrophobic mixture, solid lava powder in an amount of 6% by weight of said fine-grained hydrophobic mixture and carbon black in an amount of 4% by weight of said fine-grained hydrophobic mixture.

14. The method according to claim 5, wherein said calcium sulfate comprises flue-gas gypsum resulting from flue-gas desulphurization equipment without having been subject to prior drying treatments.

15. The method according to claim 14, wherein said residual salt comprises 80-85% by weight of the hydrophilic component and said additive comprises flue-gas gypsum in an amount of 20-15% by weight of the hydrophilic component.

* * * * *